United States Patent
Von Gynz-Rekowski et al.

(10) Patent No.: US 9,267,539 B2
(45) Date of Patent: Feb. 23, 2016

(54) MUD MOTOR BEARING ASSEMBLY AND METHOD

(75) Inventors: Gunther HH Von Gynz-Rekowski, Montgomery, TX (US); William C. Herben, Magnolia, TX (US); Daryl E. Bolejack, Magnolia, TX (US)

(73) Assignee: Ashmin, LC, Conroe, TX (US)

( * ) Notice: Subject to any disclaimer, the term of this patent is extended or adjusted under 35 U.S.C. 154(b) by 787 days.

(21) Appl. No.: 13/469,818

(22) Filed: May 11, 2012

(65) Prior Publication Data

US 2013/0299243 A1    Nov. 14, 2013

(51) Int. Cl.
| | |
|---|---|
| F16C 17/10 | (2006.01) |
| E21B 4/00 | (2006.01) |
| F16C 33/10 | (2006.01) |
| F16C 17/24 | (2006.01) |

(52) U.S. Cl.
CPC .............. *F16C 17/105* (2013.01); *E21B 4/003* (2013.01); *F16C 33/108* (2013.01); *F16C 17/246* (2013.01); *F16C 2352/00* (2013.01)

(58) Field of Classification Search
None
See application file for complete search history.

(56) References Cited

U.S. PATENT DOCUMENTS

| | | | |
|---|---|---|---|
| 4,410,054 A * | 10/1983 | Nagel et al. ................... | 175/107 |
| 4,511,193 A | 4/1985 | Geczy | |
| 4,560,014 A | 12/1985 | Geczy | |
| 4,729,440 A * | 3/1988 | Hall ............................. | 175/107 |
| 5,074,681 A | 12/1991 | Turner et al. | |
| 5,248,204 A | 9/1993 | Livingston et al. | |
| 5,364,192 A | 11/1994 | Damm et al. | |
| 5,480,233 A * | 1/1996 | Cunningham ................ | 384/308 |
| 5,911,284 A | 6/1999 | von Gynz-Rekowski | |
| 6,827,160 B2 | 12/2004 | Blair et al. | |
| 7,104,698 B1 | 9/2006 | van Drentham-Susman | |
| 7,500,787 B2 | 3/2009 | Cioceanu | |
| 2003/0111269 A1 | 6/2003 | Blair et al. | |

OTHER PUBLICATIONS

PCT International Searching Authority/US, International Search Report and Written Opinion of the International Searching Authority, mailed Sep. 13, 2013, for PCT/US2013/40484, "Mud Motor Bearing Assembly and Method."

* cited by examiner

*Primary Examiner* — Jennifer H Gay
*Assistant Examiner* — Caroline Butcher
(74) *Attorney, Agent, or Firm* — Jones Walker, LLP (57) ABSTRACT

A mud motor bearing assembly for use in drilling a hydrocarbon well. The bearing assembly includes a bearing section containing stationary bearing rigs and rotating bearing rings in stacked arrangement. The bearing rings have wedge-shaped projections. The wedge-shaped projections of two adjacent stationary bearing rings form a recess to accommodate the projection of a rotating bearing ring in sliding engagement. The bearing assembly is capable of bearing both radial and axial loads.

17 Claims, 6 Drawing Sheets

MUD MOTOR BEARING ASSEMBLY AND METHOD

FIELD OF THE INVENTION

The present invention relates to a mud motor bearing assembly and method for drilling hydrocarbon wells and more particularly to a mud motor bearing assembly and method containing a bearing section capable of bearing both radial and axial loads.

BACKGROUND OF THE INVENTION

In the drilling of oil and gas wells, a mud motor may be used for drilling tasks such as straight hole, horizontal, directional and short radius drilling. Mud motors are connected to the drill string to rotate and steer the drill bit. Mud motors typically include a power section and a bearing assembly. Rotation is provided by the power section that may be a positive displacement motor driven by drilling fluid (mud) circulation. The bearing assembly takes up the axial and radial loads imparted on the drill string during drilling.

The power section of conventional mud motors has a transmission housing, a stator secured within the transmission housing, and a rotor rotatable within the stator. The stator may have a helically contoured inner surface. The rotor may have a helically contoured outer surface. Together, they define a positive displacement fluid pump having a helically shaped progressive cavity.

The bearing assembly of typical mud motors is threadedly connected to the power section. The bearing assembly includes a bearing housing, a rotatable drive shaft secured within the bearing housing for coupling the rotor to the drill bit, and a transmission shaft for connecting the rotor to the drive shaft. The drive shaft extends downwardly through the bearing housing and is supported within the bearing housing by multiple sets of bearings. The drive shaft is fitted with the drill bit at its lower end.

Drilling fluid or mud is pumped from the well surface through the drill string or drill pipe to the mud motor. The drilling fluid or mud flows through the cavity formed between the rotor and the stator, through the portion of the transmission housing surrounding the transmission shaft, into the inlet ports provided on the drive shaft, through the drive shaft, and out through the outlet port to flush cuttings from the borehole and cool the drill bit. The drilling fluid drives the rotor to rotate within the stator, with the rotor orbiting around the inner surface of the stator. The transmission shaft transmits the rotational movements of rotor to the drive shaft. The drive shaft rotates concentrically within the bearing housing to drive the drill bit.

If the drill bit is not in contact with the bottom of the borehole, the high pressure drilling fluid applied through the drill pipe to the mud motor exerts a downwardly-directed axial thrust load to the rotor, transmission shaft, drive shaft and drill bit relative to the bearing housing. This is referred to as an off-bottom thrust load. When the drill bit is brought into contact with the bottom of the borehole, the weight of the entire drill string is imposed on the drill bit. As a result, an upwardly-directed axial thrust load is exerted on the drill bit and drive shaft. This is referred to as an on-bottom thrust load.

Figures 1A, 1B:
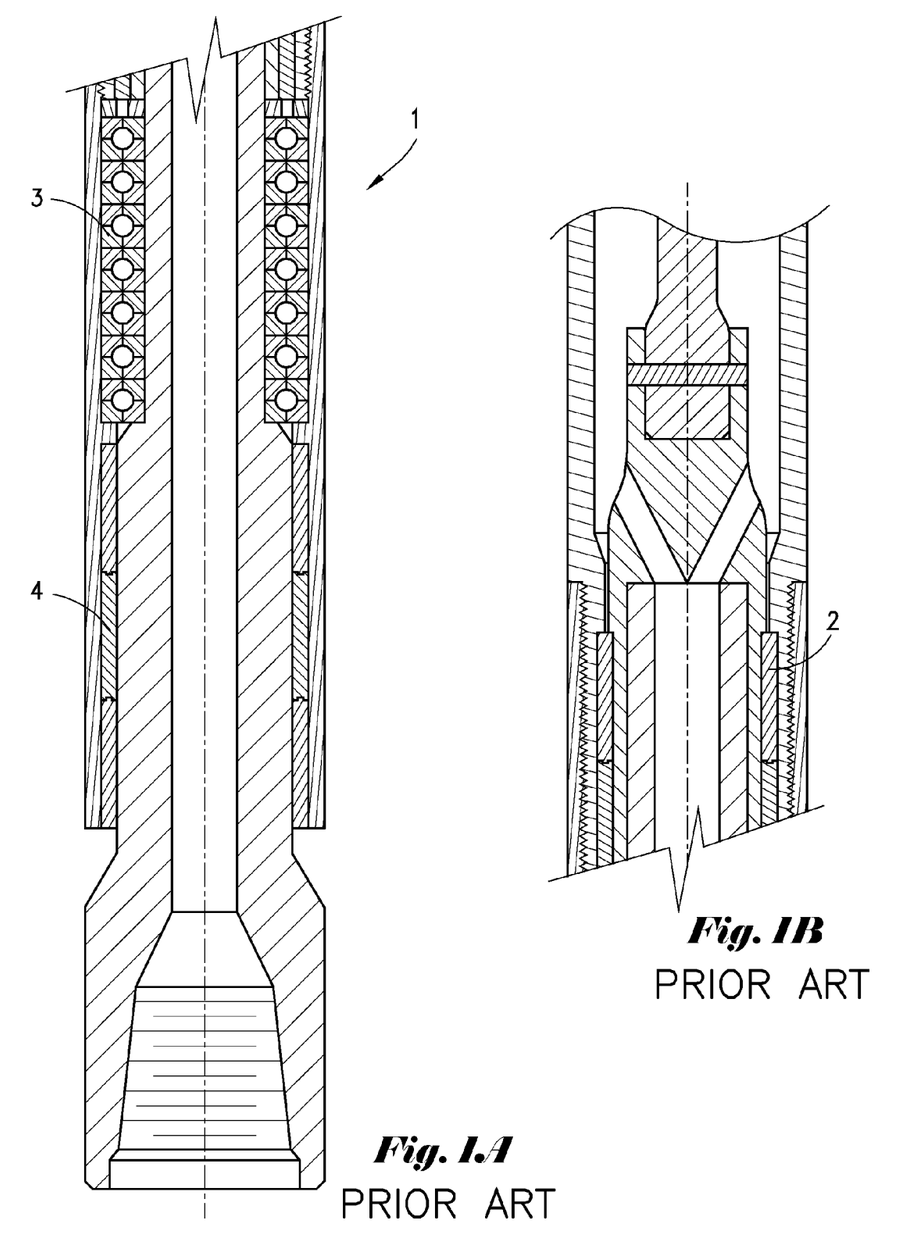
FIG. 1 is a sequential cross-sectional view of a prior-art bearing assembly.

Conventional mud motors use a combination of radial bearings and thrust bearings in order to restrict the radial and axial movement of the motor's drive shaft. A cross-sectional view of a typical prior art bearing assembly 1 is shown in FIGS. 1A and 1B. Conventional bearing assembly 1 contains three sets of bearings: upper radial bearings 2; thrust or axial bearings 3; and lower radial bearings 4.

Common radial bearings used in downhole drilling applications are journal bearings, also known as sleeve bearings. A journal bearing is formed from a plain cylindrical sleeve that carries a rotating shaft. Sometimes, journal bearings are also referred to as fluid film bearings because of the presence of a thin film of lubricant formed between the cylindrical sleeve and the rotating shaft. The coefficient of friction experienced by the rotating shaft is dependent, in large part, on whether a fluid film is fully developed. In essence, a fully developed fluid film creates a hydrodynamic pressure sufficient to float the shaft and its respective load relative to the sleeve or journal. The result of a fully developed fluid film is that there is no physical contact between the rotating shaft and the journal during operation. Proper development of a fluid film is generally dependent on adequate lubrication of the bearing journal.

Rolling element-type bearings, such as ball rollers or angular contact rollers, are often used as thrust bearings. U.S. Pat. No. 5,074,681 to Turner et al. discloses an example of ball rollers. U.S. Pat. No. 5,248,204 to Livingston et al. discloses an example of angular contact rollers. Typically, these rolling element-type bearings are lubricated by the drilling fluid (mud) or by clean oil when encased in a sealed oil chamber. Rolling element-type bearings are not tolerant of abrasives and thus wear quickly when exposed to mud lubrication. Once wear occurs, loads between the individual balls become uneven and wear rates accelerate. For the oil-lubricated bearings, once the seals fail, wear occurs in a similar way. Due to the high loads, pressure, and abrasive conditions, bearing life is typically only several hundred hours.

Another type of thrust bearing used in downhole drilling motors is a hydrodynamic or sliding surface type. U.S. Pat. No. 4,560,014 to Geczy discloses an example of this hydrodynamic bearing type, which uses rigidly mounted pads manufactured of industrial diamond. The diamond pads are mud-lubricated and slide against each other. These bearings, however, are extremely expensive and only marginally increase service life.

Bearings in the bearing assembly are exposed to harsh conditions. The bearings are subjected to extreme forces and loads. The bearings also encounter abrasives contained within the drilling mud or other lubricants. Bearings have a limited service life due to operational conditions, regardless of the type of thrust bearings used. Failure of the bearings often results in the thrust load being absorbed by the bearing housing as it contacts the drill shaft. Such metal-on-metal contact causes degradation of the bearing housing. Therefore, when the bearings fail, the entire drill string must be removed from the wellbore so that the mud motor can be replaced. The cost to repair and maintain conventional mud motors is significant. Typical mud motors contain numerous components requiring a skilled technician to undertake the repairs. The mud motors may be out of service for extended periods due to the number of components that must be examined or replaced.

SUMMARY OF THE INVENTION

It is an object of the present invention to provide a mud motor bearing assembly that is economical to construct.

It is a further object of the present invention to provide a mud motor bearing assembly that has a simplified design.

It is a further object of the present invention to provide a mud motor bearing assembly with a reduced number of components.

It is a further object of the present invention to provide a mud motor bearing assembly having one bearing section.

It is a further object of the present invention to provide a mud motor bearing assembly having one bearing section capable of bearing both axial and radial loads.

These and other objects and advantages are achieved by a novel mud motor bearing assembly of the present invention. The bearing assembly may include a stationary housing, a rotatable drive shaft extending through the housing, and a bearing section. The bearing section may include a first stationary bearing ring having an inner periphery and an outer periphery. The outer periphery of the first stationary bearing ring may be operatively engaged to the stationary housing. The inner periphery of the first stationary bearing ring may include a projection. The bearing section may also include a second stationary bearing ring having an inner periphery and an outer periphery. The outer periphery of the second stationary bearing ring may be operatively engaged to the stationary housing. The inner periphery of the second stationary bearing ring may include a projection. The bearing section may also include a rotating bearing ring having an inner periphery and an outer periphery. The inner periphery of the rotating bearing ring may be operatively engaged to the drive shaft. The outer periphery of the rotating bearing ring may include a projection. The rotating bearing ring may be disposed between the first stationary bearing ring and the second stationary bearing ring such that the projection of the rotating bearing ring is slidably engaged with the projections of the first and second stationary bearing rings.

The projections of the rotating bearing ring and the first and second stationary bearing rings may be wedge-shaped. The projections of the rotating bearing ring and the first and second stationary bearing rings may also comprise a wear resistant face.

The wedge-shaped projections of the rotating bearing rings and the stationary bearing rings may each include two side walls. Each side wall may contain a recess for accommodation of a bearing ball. The bearing section may include at least one bearing ball rotatably contained between adjacent side walls of the rotating and stationary bearing rings within the recesses therein.

The wedge-shaped projections of the rotating bearing rings and the stationary bearing rings may also each include two side walls. Each side wall may contain a wear insert positioned within a recess therein.

Another embodiment of the mud motor bearing assembly of the present invention may include a stationary housing having an inner wall surface defining an interior bore. The bearing assembly may also include a rotatable drive shaft extending through the interior bore of the stationary housing. The rotatable drive shaft may have a tubular drive shaft with a uniform outer diameter terminating at an outlet section with an enlarged outer diameter. The rotatable drive shaft may include a inner bore for passage of drilling fluid. The bearing assembly may also have a bearing section bearing a radial load and an axial load. The bearing section may include at least a pair of stationary bearing rings and at least a pair of rotating bearing rings in stacked arrangement. Each of the stationary bearing rings may have an inner periphery and an outer periphery. The outer periphery of each of the stationary bearing rings may be operatively engaged to the inner wall of the stationary housing. The inner periphery of each of the stationary bearing rings may include a projection. Each of the rotating bearing rings may have an inner periphery and an outer periphery. The inner periphery of each of the rotating bearing rings may be operatively engaged to the tubular drive shaft. The outer periphery of each of the rotating bearing rings may include a projection. The projections of the pair of stationary bearing rings may form a recess that accommodates the projection of one of the pair of rotating bearing rings in sliding engagement.

The projections of the pair of stationary bearing rings of this embodiment may be wedge-shaped. The projections of the pair of rotating bearing rings may also be wedge-shaped.

In the embodiment, the bearing section may contain 3 to 6 pairs of stationary bearing rings and rotating bearing rings. The bearing section may contain 6 pairs of stationary and rotating bearing rings.

Also in this embodiment, the projections of the pair of stationary bearing rings and the projections of the pair of rotating bearing rings may include a wear-resistant face. The wedge-shaped projections of the rotating bearing rings and the stationary bearing rings may each be comprised of two side walls. Each side wall may contain a recess for accommodation of a bearing ball. The bearing section may include at least one bearing ball rotatably contained between adjacent side walls of the rotating and stationary bearing rings within the recesses therein. The wedge-shaped projections of the rotating bearing rings and the stationary bearing rings may also be each comprised of two side walls with each side wall containing a wear insert positioned within a recess therein.

In the embodiment, an upper end of the stationary housing may be detachably connected to a transmission housing having an inner wall surface defining an interior bore. The bearing section may surround the tubular drive shaft.

Also in this embodiment, the bearing assembly may include an adaptor having an upper section and a lower section. The lower section of the adaptor may be operatively connected to an upper end of the tubular drive shaft. The upper section of the adaptor may be detachably connected to a transmission shaft. The adaptor may have one or more inlet ports for passage of the drilling fluid from the interior bore of the transmission housing to the inner bore of the rotatable drive shaft. The bearing assembly may also include a channel for passage of the drilling fluid to the bearing section. The channel may be formed by an outer surface of the adaptor and an inner surface of the transmission housing.

The bearing assembly may further include a spacer containing the bearing section within the bearing assembly. The spacer may comprise an outer spacer held in position by the transmission housing and an inner spacer held in position by the outer spacer.

The bearing assembly may also include a drill bit assembly operatively connected to the outlet section of the rotatable drive shaft.

The present invention is also directed to a method of drilling a hydrocarbon well. The method may include the step of providing a mud motor assembly on a drill string. The mud motor assembly may comprise: a stationary housing having an inner wall surface defining an interior bore; a rotatable drive shaft extending through the interior bore of the stationary housing, the rotatable drive shaft having a tubular drive shaft with a uniform outer diameter terminating at an outlet section having an enlarged outer diameter, the rotatable drive shaft including a inner bore for passage of a drilling fluid; a bearing assembly including a bearing section bearing a radial load and an axial load, the bearing section including at least a pair of stationary bearing rings and at least a pair of rotating bearing rings in stacked arrangement, each of the stationary bearing rings having an inner periphery and an outer periphery, the outer periphery of each of the stationary bearing rings operative engaged to the inner wall of the stationary housing, the inner periphery of each of the stationary bearing rings including a projection, each of the rotating bearing rings having an inner periphery and an outer periphery, the inner periphery of each of the rotating bearing rings operatively engaged to the tubular drive shaft, the outer periphery of each of the rotating bearing rings including a projection, the projections of the pair of stationary bearing rings forming a recess that accommodates the projection of one of the pair of rotating bearing rings in sliding engagement; and a drill bit assembly operatively connected to the outlet section of the rotatable drive shaft. The method may also include the step of running the mud motor assembly downhole to a position where drilling is desired. The method include the step of pumping a drilling fluid from a surface of the hydrocarbon well through the drill string to the mud motor assembly to actuate a rotation of the rotatable drive shaft and the drill bit assembly operatively connected thereto. The method includes the step of permitting the bearing section to bear a radial load caused by rotation of the rotatable shaft and an axial load caused by the pumping of the drilling fluid or by a weight of the drill string.

The method may further comprise the step of channeling a portion of the drilling fluid to the bearing section to form a hydrodynamic fluid film therein.

In the method of the present invention, the bearing section may contain 3 to 6 pairs of stationary bearing rings and rotating bearing rings. The projections of the pair of stationary bearing rings and the projections of the pair of rotating bearing rings may include a wear-resistant face or wear insert.

The many other objects and advantages of the present invention will be readily apparent to one skilled in the art to which the invention pertains from a perusal of the claims and the following detailed description of he preferred embodiments and read in conjunction with the appended drawings.

DETAILED DESCRIPTION OF THE PREFERRED EMBODIMENTS

Figures 2A, 2B:
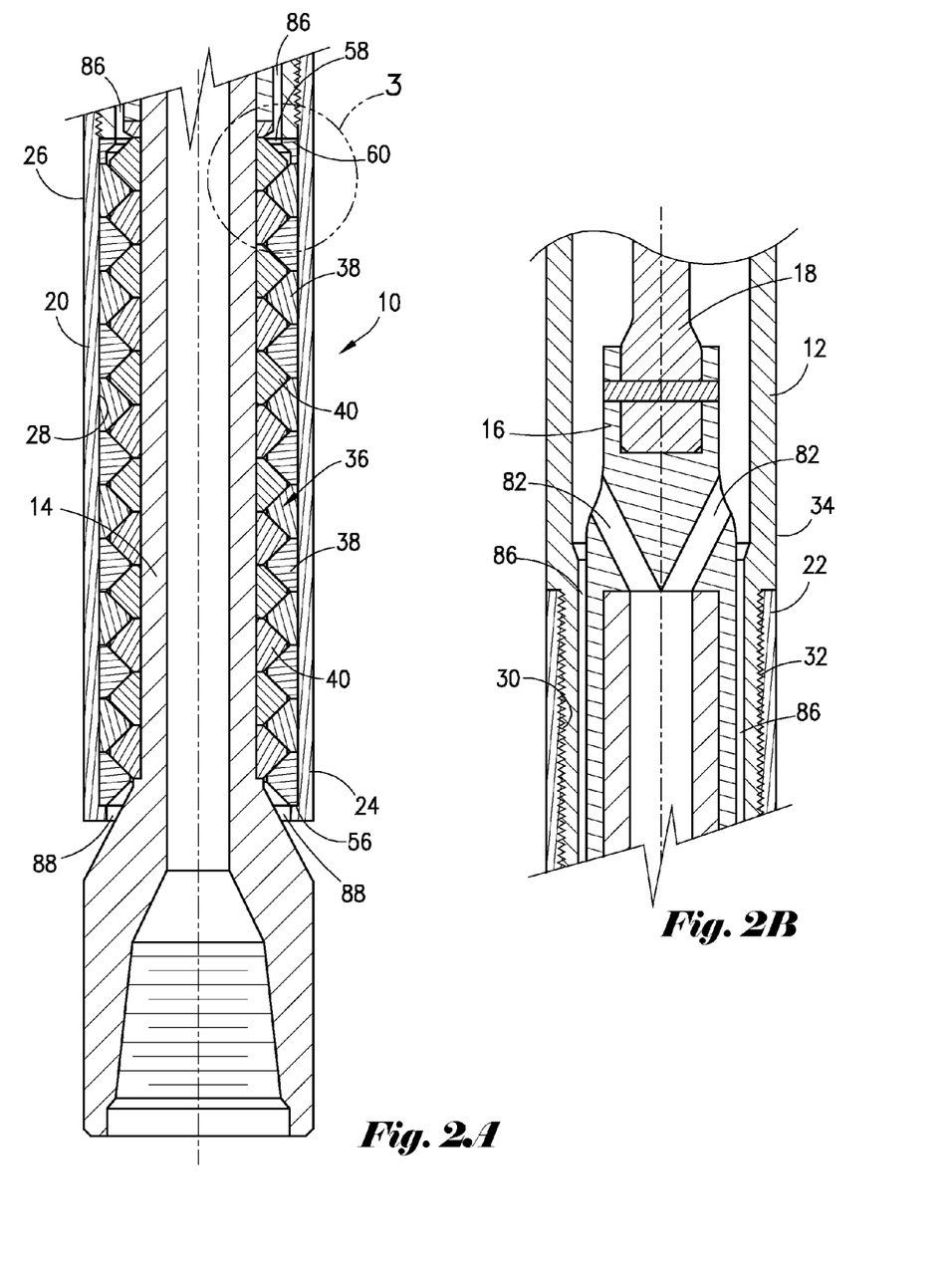
FIGS. 2A and 2B are a sequential cross-sectional view of an embodiment of the bearing assembly of the present invention.

With reference to the figures where like elements have been given like numerical designation to facilitate an understanding of the present invention, and particularly with reference to the embodiment of the present invention illustrated in FIGS. 2A and 2B, bearing assembly 10 is shown threadedly connected to transmission housing 12 and supporting drive shaft 14, which is threadedly connected to adapter 16 which in turn is threadedly connected to transmission shaft 18. Bearing assembly 10 restricts both the radial movement and axial movement of drive shaft 14.

With reference to FIGS. 2A and 2B, bearing assembly 10 includes bearing housing 20. Bearing housing 20 has upper end 22 and lower end 24. Bearing housing also has outer surface 26 and inner surface 28. Threads 30 contained in inner surface 28 of upper end 22 cooperate with corresponding threads 32 on outer surface 34 of transmission housing 12 to detachably or threadedly connect bearing assembly 10 to transmission housing 12.

Figure 3:
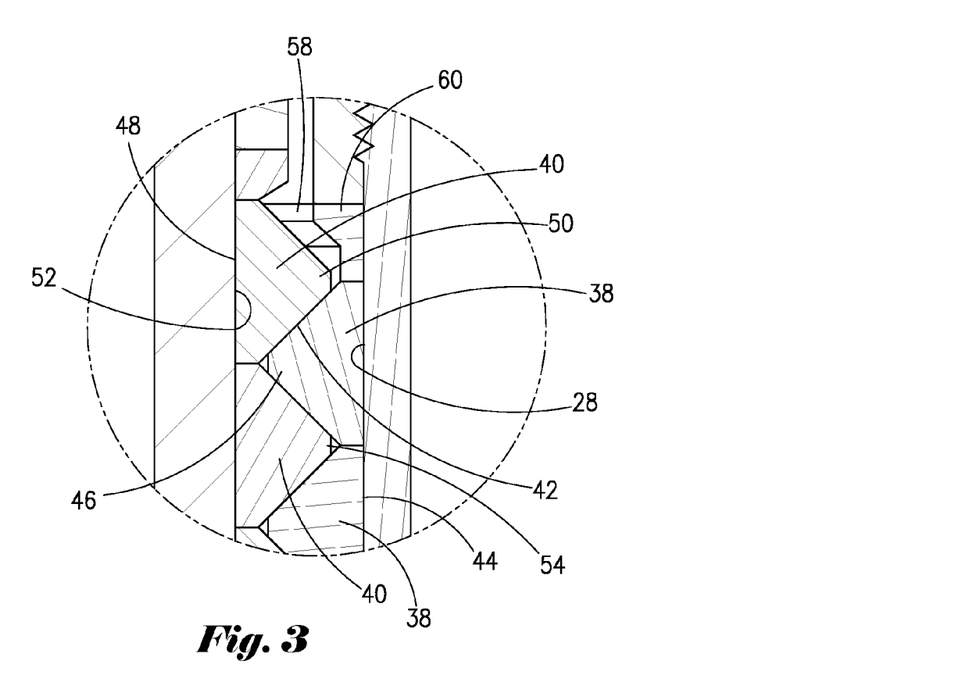
FIG. 3 is a partial cross-sectional view of the bearing assembly shown in FIG. 2A.

As seen in FIGS. 2A, 2B, and 3, bearing assembly 10 includes bearing section 36. Bearing section 36 may include stacked or cooperating bearing rings in series. Each series includes first stationary bearing ring 38, second stationary bearing ring 38, and rotating bearing ring 40. Stationary bearing rings 38 each have inner periphery 42 and outer periphery 44. Outer periphery 44 of each stationary bearing ring 38 may be affixed to inner surface 28 of bearing housing 20 such that stationary bearing rings 38 are prevented from rotating relative to bearing housing 20. Stationary bearing rings 38 may be affixed to inner surface 28 of bearing housing 20 by various methods such as by a weld, a pin, a brace, a bolt, or a screw. Stationary bearing rings 38 could also be made integral with bearing housing 20. Inner periphery 42 of each stationary bearing ring 38 has outwardly extending projection 46. Outwardly extending projection 46 may be wedge-shaped. Stationary bearing rings 38 are secured to or by bearing housing 20 by friction due to holding the rings in compression or by splines, keys, or other similar arrangement.

FIGS. 2A, 2B, and 3 also show that each rotating bearing ring 40 has inner periphery 48 and outer periphery 50. Inner periphery 48 may be operatively engaged or connected to outer surface 52 of drive shaft 14 such that rotating bearing rings 40 rotate with the rotation of drive shaft 14. Rotating bearing rings 40 may be operatively connected to drive shaft 14 by a variety of methods including by a pin, a bolt, or a screw. Outer periphery 50 of each rotating bearing ring 40 has outwardly extending projection 54. Outwardly extending projection 54 may be wedge-shaped. Rotating bearing rings 40 are secured to or by drive shaft 14 by friction due to holding the rings in compression or by splines, keys, or other similar arrangement.

With reference to FIGS. 2A, 2B and 3, first stationary bearing ring 38, rotating bearing ring 40, and second stationary bearing ring 38 are in a stacked arrangement within bearing housing 20. Rotating bearing ring 40 is disposed between first stationary bearing ring 38 and second stationary bearing ring 38. Outwardly extending projection 54 of rotating bearing ring 40 slidably engages outwardly extending projections 46 of first and second stationary bearing rings 38 as drive shaft 14 rotates within bearing housing 20.

Again with reference to FIGS. 2A and 3, bearing means 36 may be supported within bearing housing 20 by shoulder 56 in lower end 24 of bearing housing 20 and by adapter 16 and transmission housing 12 via inner spacer 58 and outer spacer 60.

Figure 4:
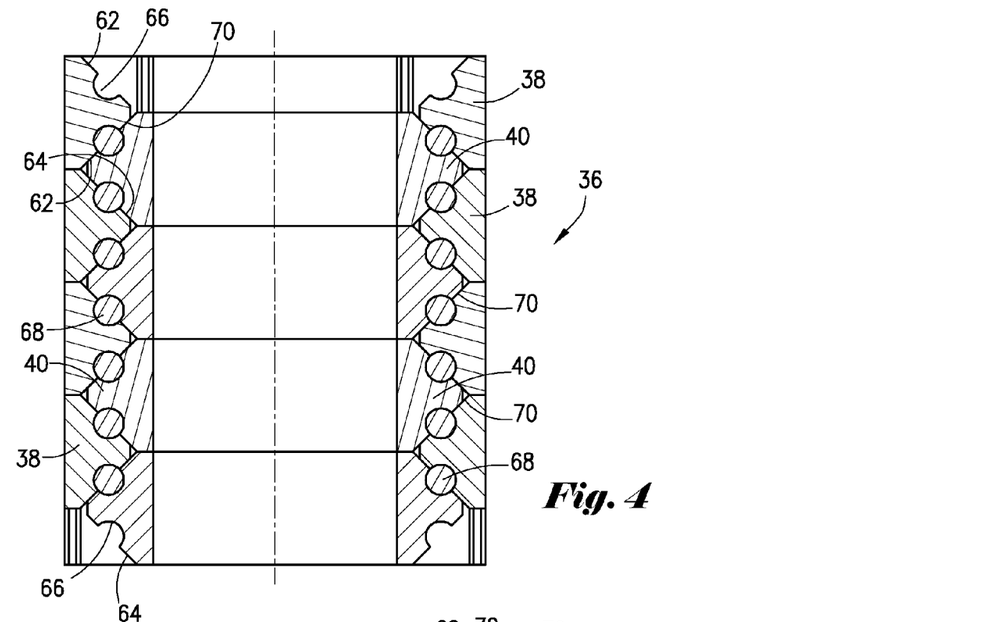
FIG. 4 is a partial cross-sectional view of an alternative embodiment of the bearing assembly of the present invention.

FIG. 4 depicts an alternative bearing section 36. In the alternative bearing section 36, sides 62 of outwardly extending projections 46 of stationary bearing rings 38 and sides 64 of outwardly extending projections 54 of rotating bearing rings 40 each have recess 66 that accommodates bearing ball 68. When first stationary bearing ring 38, rotating bearing ring 40, and second stationary bearing ring 38 are in a stacked arrangement within bearing housing 20, rotating bearing ring 40 is disposed between first stationary bearing ring 38 and second stationary bearing ring 38. A first ball bearing 68 is situated in recesses 66 of and between first stationary bearing ring 38 and rotating bearing ring 40. A second ball bearing 68 is situated in recesses 66 of and between second stationary bearing ring 38 and rotating bearing ring 40. Outwardly extending projection 54 of rotating bearing ring 40 slidably engages outwardly extending projections 46 of first and second stationary bearing rings 38 as drive shaft 14 rotates within bearing housing 20. Ball bearings 68 rotate within recesses 66 as rotating bearing ring 40 slidably engages outwardly extending projections 46 of first and second stationary bearing rings 38 as drive shaft 14 rotates within bearing housing 20. Ball bearings 68 function to enhance the sliding engagement of bearing rings 38, 40 and to take up wear that otherwise would be incurred by bearing rings 38, 40. Gap 70 provides a separation between stationary bearing rings 38 and rotating bearing rings 40 through which drilling fluid, mud, or other lubricant can travel, thereby coating the rings 38, 40. The coating cools bearing rings 38, 40 during rotation to lessen their wear.

Figure 5:
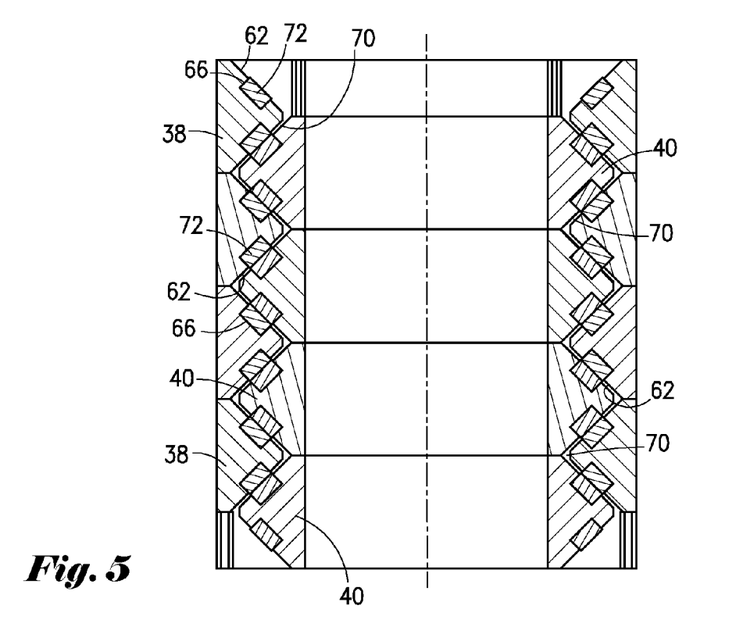
FIG. 5 is a partial cross-sectional view of a first alternative embodiment of the bearing assembly of the present invention.

FIG. 5 shows another alternative bearing section 36. Recesses 66 in sides 62, 64 of respective stationary and rotating bearing rings 38, 40 includes inserts 72. Inserts 72 in opposing sides 62, 64 of respective stationary bearing rings 38 and rotating bearing rings 40 are in cooperative engagement such that during rotation of rotating bearing rings 40, opposing or adjacent inserts 72 are in sliding engagement and take up wear. Gaps 70 provide a pathway for drilling fluid, mud, or lubricant to cool bearing rings 38, 40 and inserts 72 to lessen wear. Inserts 72 could be made in a variety of shapes.

FIG. 5 shows insert 72 as being substantially rectangular-shaped.

Figure 6:
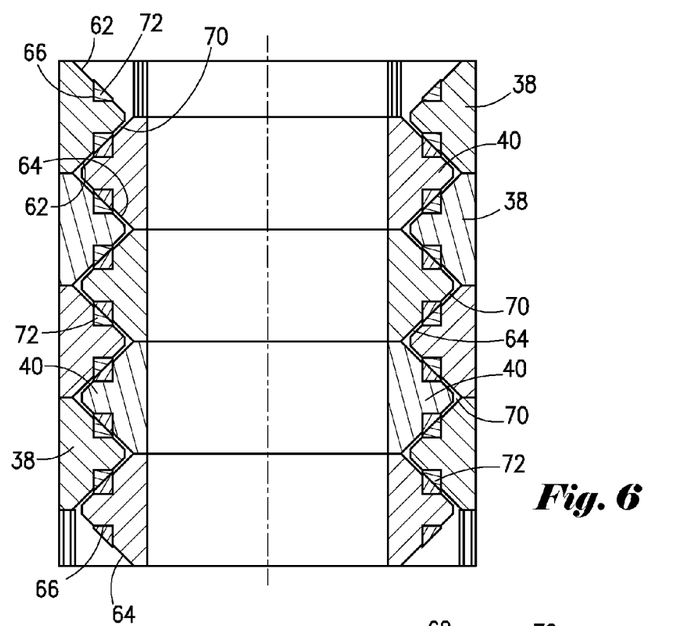
FIG. 6 is a partial cross-sectional view of a second alternative embodiment of the bearing assembly of the present invention.

FIG. 6 shows insert 72 as being substantially triangular-shaped.

Figure 7:
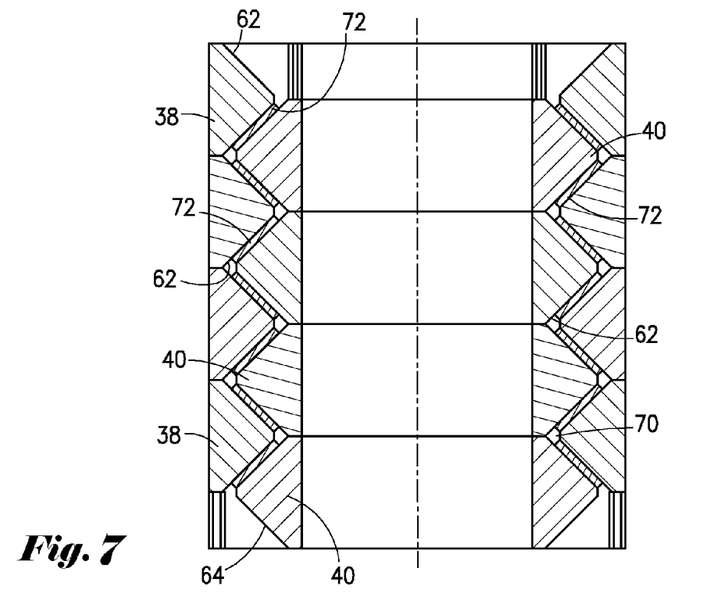
FIG. 7 is partial cross-sectional view of a third alternative embodiment of the bearing assembly of the present invention.

FIG. 7 shows another alternative bearing section 36. Sides 62, 64 of respective stationary and rotating bearing rings 38, 40 contain insert 72 affixed thereon rather than housed in a recess. Insert 72 may be affixed to stationary and rotating bearing rings by a variety of methods such as by a weld, a pin, screwed, or bolted. Insert 72 could also be made integral with bearing rings 38, 40.

Stationary bearing rings 38 and rotating bearing rings 40 may be made of hardened material such as heat-treated metal, carbide steel, copper, or a metal alloy. Ball bearings 68 and inserts 72 may be made of hardened material such as heat-treated metal, carbide steel, copper, metal alloy, ceramics, wood or elastomeric plastic.

Figure 8:
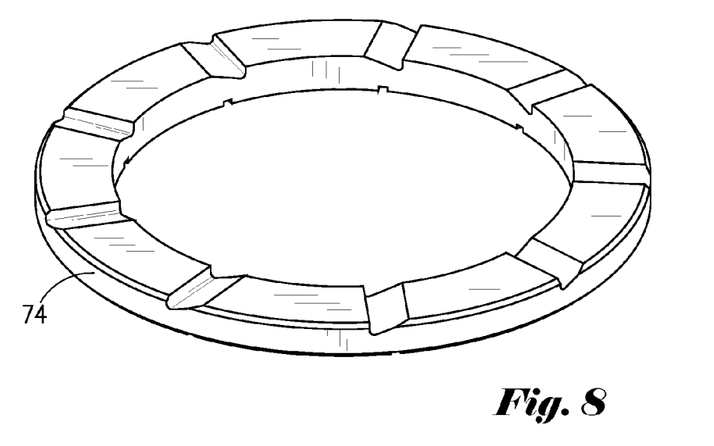
FIG. 8 is schematic view of an alternative hydrodynamic bearing ring that could be used in the bearing assembly of the present invention.

FIG. 8 shows a further alternative bearing section 36. Bearing section 36 may include one or more hydraulic bearings 74. Bearing 74 may be a one-piece thrust bearing that uses geometry-induced hydrodynamic lubrication to support heavy thrust loads on a lubricant film. Bearing 74 tolerates high impact loads without performance degradation and reduces friction which permits higher load/speed combinations, cooler operation and extended operational life. Bearing 74 is commercially available from Kalsi Engineering under the model name Kalsi Bearing.

Figure 9:
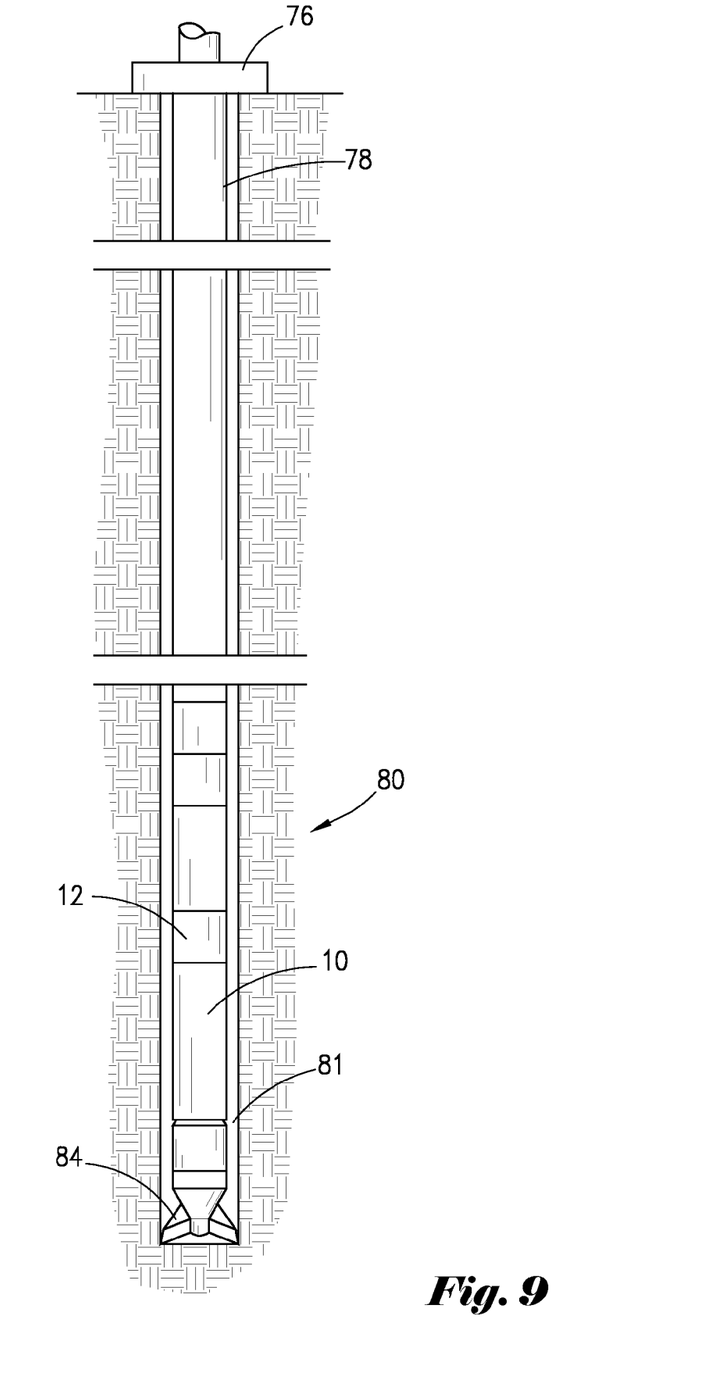
FIG. 9 is a schematic representation of the bearing assembly of the present invention of FIG. 2 on a drill string.

As seen in FIGS. 2A, 2B and 9, pressurized drilling fluid or mud is pumped from well surface 76, through drill string 78, and to mud motor 80 in wellbore 81. The fluid or mud travels through the interior of transmission housing 12 to adaptor 16. The fluid or mud may passes through conduits 82 in adaptor 16 and down through the inner bore of drive shaft 14 and to drill bit 84 to actuate drill bit 84. Some of the drilling fluid or mud is diverted into channel 86 and flows through bearing section 36 to lubricate and cool stationary and rotating bearing rings 38, 40. Additionally, as rotation commences, the drilling fluid is distributed across the faces of bearing ring outwardly extending projections 46, 54, resulting in the formation of a hydrodynamic fluid film within bearing section 36. Excess drilling fluid may be discharged from bearing assembly 10 through outlet channel 88 in lower end 24 of bearing housing 20. In an embodiment, the bearing ring projections 46, 54 may have one or more grooves on their faces in order to facilitate the flow of drilling fluid through bearing section 36. Gaps 70 between the opposing faces of projections 46, 54 also promote the flow of the drilling fluid or mud throughout bearing section 36.

When drive shaft 14 is first rotated, metal-on-metal contact may occur between stationary bearing rings 38 and rotating bearing rings 40. Additionally, the drilling fluid flowing within bearing section 36 typically contains highly abrasive particles. In light of this operating environment, the faces of bearing ring outwardly extending projections 46, 54 can have wear resistant inserts to prevent premature bearing failure such as inserts 72 mentioned herein. The wear resistant inserts can be constructed out of tungsten carbide, silicon carbide, and other metals having sufficient hardness.

Thrust bearing section 36 absorbs hydraulic loading from the motor and mechanical loads imposed during drilling operations. As shown in FIGS. 2A and 2B, bearing section 36 may have a plurality of stationary bearing rings 38 longitudinally stacked within bearing housing 20, with a plurality of rotating bearing rings 40 disposed between stationary bearing rings 38. In this stacked arrangement or configuration, the thrust load is evenly dispersed across the face of the bearing ring projections 46, 54. As each additional bearing ring 38, 40 is added to bearing section 36, additional surface area is available to disperse the thrust load. Accordingly, the thrust load on any given bearing ring 38, 40 is inversely proportional to the number of bearing rings 38, 40 in bearing section 36.

Bearing section 36 of the present invention is double acting. Bearing rings 38, 40 are in sliding contact between adjacent rings 38, 40. Thrust loading is distributed throughout the bearing rings 38, 40. Thrust loading is evenly split through the number of rings 38, 40 comprising bearing section 36. Maximum axial wear of bearing rings 38, 40 is determinative of the maximum axial play of the bearings.

The mud motor and/or bearing assembly 10 of the present invention contains fewer operational components than conventional mud motors. For example, bearing section 36 eliminates the need for bearing assembly 10 to contain upper radial and lower radial bearings. The mud motor and/or bearing assembly 10 of the present invention has less connections and more standard connections than conventional mud motors. No special maintenance tools are required for the present invention. Accordingly, the mud motor and/or bearing assembly 10 of the present invention is more economical to manufacture and operate. Furthermore, bearing section 36 of the present invention is more reliable and less prone to wear than conventional mud motors and bearing assemblies.

While preferred embodiments of the present invention have been described, it is to be understood that the embodiments described are illustrative only and that the scope of the invention is to be defined solely by the appended claims when accorded a full range of equivalents in view of the many variations and modifications naturally occurring to those skilled in the art from a perusal hereof.

What is claimed is:
1. A mud motor bearing assembly, comprising:
 a stationary housing having an inner wall surface defining an interior bore;
 a rotatable drive shaft extending through the interior bore of the stationary housing, the rotatable drive shaft having a tubular drive shaft with a uniform outer diameter ter- minating at an outlet section with an enlarged outer diameter, the rotatable drive shaft including an inner bore for passage of a drilling fluid;

a bearing section bearing a radial load and an axial load, the bearing section including at least a pair of stationary bearing rings and at least a pair of rotating bearing rings in stacked arrangement, each of the stationary bearing rings having an inner periphery and an outer periphery, the outer periphery of each of the stationary bearing rings operatively engaged to the inner wall of the stationary housing, the inner periphery of each of the stationary bearing rings including a projection, each of the rotating bearing rings having an inner periphery and an outer periphery, the inner periphery of each of the rotating bearing rings operatively engaged to the tubular drive shaft, the outer periphery of each of the rotating bearing rings including a projection, the projections of the pair of stationary bearing rings forming a recess that accommodates the projection of one of the pair of rotating bearing rings in sliding engagement;

wherein the stacked arrangement alternates between at least partially overlapping stationary bearing rings and rotating bearing rings.

2. The mud motor bearing assembly according to claim 1, wherein the projections of the pair of stationary bearing rings are wedge-shaped.

3. The mud motor bearing assembly according to claim 2, wherein the projections of the pair of rotating bearing rings are wedge-shaped.

4. The mud motor bearing assembly according to claim 3, wherein the wedge-shaped projections of the rotating bearing rings and the stationary bearing rings are each comprised of two side walls, each side wall containing a recess for accommodation of a bearing ball, and wherein the bearing section includes at least one bearing ball rotatably contained between adjacent side walls of the rotating and stationary bearing rings within the recesses therein.

5. The mud motor bearing assembly according to claim 3, wherein the wedge-shaped projections of the rotating bearing rings and the stationary bearing rings are each comprised of two side walls, each side wall containing a wear insert positioned within a recess therein.

6. The mud motor bearing assembly according to claim 1, wherein the bearing section contains 3 to 6 pairs of stationary bearing rings and rotating bearing rings.

7. The mud motor bearing assembly according to claim 1, wherein the projections of the pair of stationary bearing rings and the projections of the pair of rotating bearing rings include a wear-resistant face.

8. The mud motor bearing assembly according to claim 1, wherein an upper end of the stationary housing is detachably connected to a transmission housing having an inner wall surface defining an interior bore and wherein the bearing section surrounds the tubular drive shaft.

9. The mud motor bearing assembly according to claim 8, further comprising an adaptor having an upper section and a lower section, the lower section being operatively connected to an upper end of the tubular drive shaft, the upper section being detachably connected to a transmission shaft and including one or more inlet ports for passage of the drilling fluid from the interior bore of the transmission housing to the inner bore of the rotatable drive shaft.

10. The mud motor bearing assembly according to claim 9, further comprising a channel for passage of the drilling fluid to the bearing section, the channel formed by an outer surface of the adaptor and an inner surface of the transmission housing.

11. The mud motor bearing assembly according to claim 10, further comprising a spacer containing the bearing section within the bearing assembly.

12. The mud motor bearing assembly according to claim 11, wherein the spacer comprises an outer spacer held in position by the transmission housing and an inner spacer held in position by the outer spacer.

13. The mud motor bearing assembly according to claim 1, further comprising a drill bit assembly operatively connected to the outlet section of the rotatable drive shaft.

14. A method of drilling a hydrocarbon well, comprising the steps of:

(a) providing a mud motor assembly on a drill string, the mud motor assembly comprising: a stationary housing having an inner wall surface defining an interior bore; a rotatable drive shaft extending through the interior bore of the stationary housing, the rotatable drive shaft having a tubular drive shaft with a uniform outer diameter terminating at an outlet section having an enlarged outer diameter, the rotatable drive shaft including an inner bore for passage of a drilling fluid; a bearing assembly including a bearing section bearing a radial load and an axial load, the bearing section including at least a pair of stationary bearing rings and at least a pair of rotating bearing rings in stacked arrangement, each of the stationary bearing rings having an inner periphery and an outer periphery, the outer periphery of each of the stationary bearing rings operatively engaged to the inner wall of the stationary housing, the inner periphery of each of the stationary bearing rings including a projection, each of the rotating bearing rings having an inner periphery and an outer periphery, the inner periphery of each of the rotating bearing rings operatively engaged to the tubular drive shaft, the outer periphery of each of the rotating bearing rings including a projection, the projections of the pair of stationary bearing rings forming a recess that accommodates the projection of one of the pair of rotating bearing rings in sliding engagement; and a drill bit assembly operatively connected to the outlet section of the rotatable drive shaft; wherein the stacked arrangement alternates between at least partially overlapping stationary bearing rings and rotating bearing rings;

(b) running the mud motor assembly downhole to a position where drilling is desired;

(c) pumping a drilling fluid from a surface of the hydrocarbon well through the drill string to the mud motor assembly to actuate a rotation of the rotatable drive shaft and the drill bit assembly operatively connected thereto; and (d) permitting the bearing section to bear a radial load caused by rotation of the rotatable shaft and an axial load caused by the pumping of the drilling fluid or by a weight of the drill string.

15. The method according to claim 14, further comprising the step of channeling a portion of the drilling fluid to the bearing section to form a hydrodynamic fluid film therein.

16. The method according to claim 14, wherein the bearing section contains 3 to 6 pairs of stationary bearing rings and rotating bearing rings.

17. The method according to claim 14, wherein the projections of the pair of stationary bearing rings and the projections of the pair of rotating bearing rings include a wear-resistant face or wear insert.

* * * * *